United States Patent Office

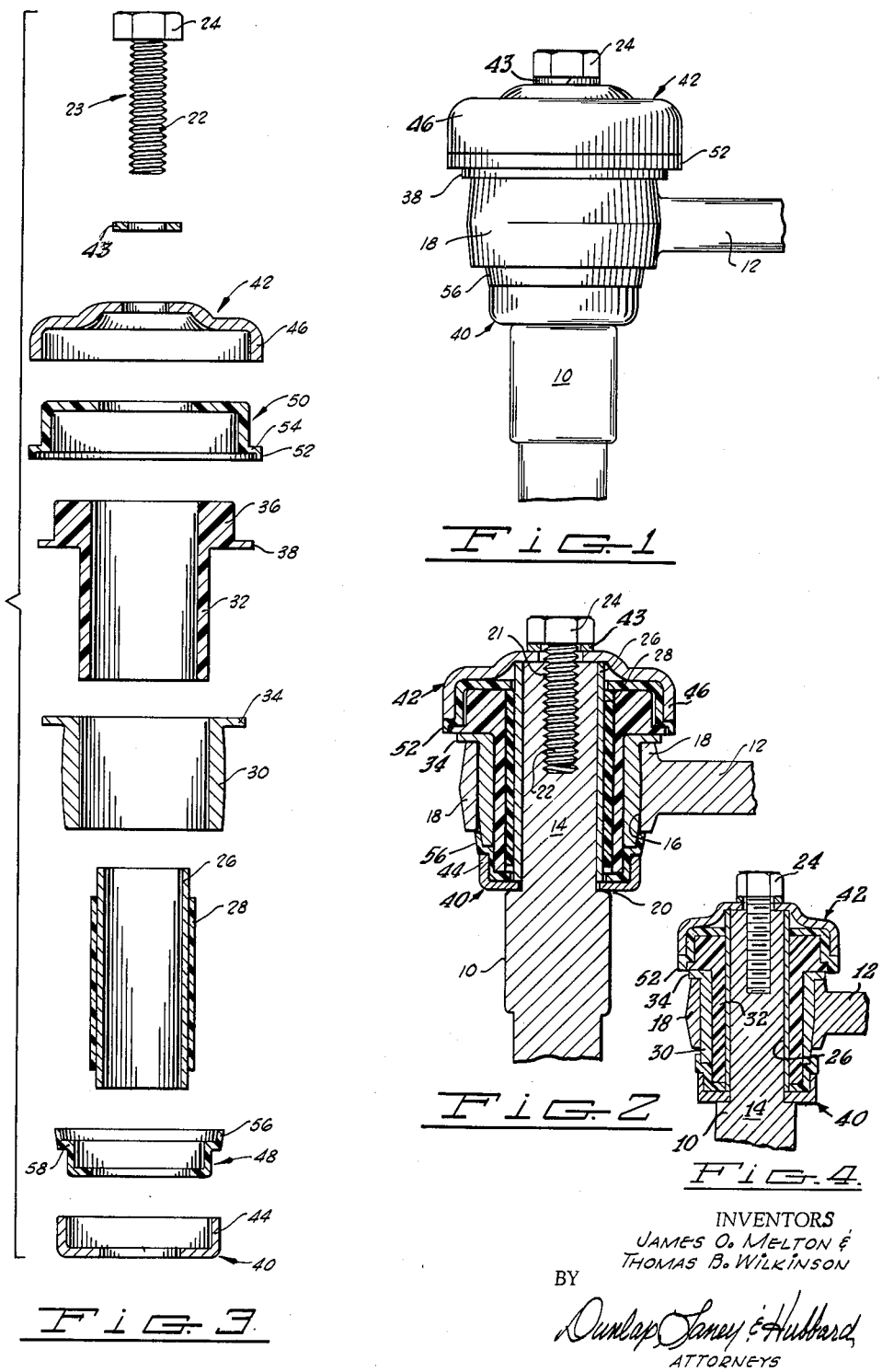

3,139,311
Patented June 30, 1964

3,139,311
BEARING ASSEMBLY FOR PIVOTALLY INTER-
CONNECTING TWO MEMBERS
James O. Melton, Norman, and Thomas B. Wilkinson,
Oklahoma City, Okla., assignors to Jamco, Inc., Okla-
homa City, Okla., a corporation of Oklahoma
Filed July 13, 1962, Ser. No. 209,655
16 Claims. (Cl. 308—37)

This invention relates, as indicated, to a bearing assembly for pivotally interconnecting two members. More particularly, the present invention relates to a bearing assembly providing a pivotal connection between a first member having a generally cylindrical spindle portion thereon and a second member having an aperture therein for receiving the cylindrical spindle portion of said first member. In a yet more specific aspect, the invention contemplates the use of high density, low coefficient of friction, synthetic resin materials in certain specific types of bearings wherein such materials have not heretofore been utilized.

The properties of certain synthetic resins such as Nylon, Teflon and polyethylene which make these plastics highly useful as bearing materials is well known. A great variety of applications of these materials have been devised wherein the high density and low coefficient of friction of the resins permit them to perform superiorly as bearing surfaces to metallic constructions heretofore utilized.

It is an object of the present invention to propose a new application of such materials to produce a new type of bearing assembly which may be economically constructed, is characterized by a long and trouble-free service life, and is superior in its performance to bearings of the same general type as they have heretofore been constructed.

Another, and more specific, object of the invention is to provide a bearing assembly which is especially well adapted for use in the idler arm connections of an automobile steering linkage.

Another object of the present invention is to provide a bearing assembly for pivotally interconnecting two members, which assembly affords a minimum of frictional resistance to the pivotal movement of said members relative to each other.

A further object of the invention is to provide a bearing assembly for use in pivotally interconnecting two members, which bearing assembly affords maximum assurance against the ingress of dirt, water and other deleterious substances to the bearing surfaces.

An additional object of the invention is to provide a bearing assembly which is able to withstand sudden and repeated shocks and constant vibrational stress without malfunctioning.

The foregoing objects of the present invention are accomplished by providing a bearing assembly in which the high strength of steel and the resiliency and low coefficient of friction characteristics of high density synthetic resins are utilized in combination. As previously indicated, the bearing assembly is adapted for pivotally interconnecting two relatively moving members, one of which is provided with a cylindrical spindle portion, and the other of which is provided with an aperture through which the spindle portion of the first member projects when the two are interconnected with the bearing assembly of this invention. Broadly, the bearing assembly comprises a metallic tubular member or liner, preferably constructed of steel, which is positioned around the spindle portion of one of the connected members and which functions to withstand or carry the major portion of the axial load which is imposed upon the bearing, and also to relieve the bearing from overloading and to limit pre-loading of the bearing. Positioned around the metallic liner and pressed into the aperture in the second of the two interconnected members is a bushing constructed of a high density, synthetic resin material having a low coefficient of friction. At each end of the resin bushing, and positioned between the bushing and means which are provided on the spindle portion for retaining the bearing assembly in fixed axial relation with respect to the spindle, are a pair of bearing members which are also constructed of the high density, synthetic resin material. In a preferred embodiment of the invention, the synthetic resin bushing and the resin bearing members are constructed of resins having dissimilar molecular structures so that the tendency for interpolymerization to occur between the bearing surfaces of the bushing and the bearing members under the influence of high temperature and pressure conditions is minimized.

More specifically, the bearing assembly of the invention comprises a tubular or cylindrical metallic sleeve which is positioned around the spindle portion of one of two members which it is desired to interconnect by means of the bearing assembly, bushing means pressed into an aperture in the second of the two interconnected members and surrounding the metallic sleeve, high density synthetic resin cup-shaped bearing washers positioned at each end of the bushing in bearing engagement therewith, cup-shaped metallic washers complementary in configuration to said resin bearing washers and frictionally engaging said bearing washers at the sides thereof opposite the sides of the bearing washers engaging the bushing, and retainer means on the spindle of said first member for pressing said metallic washers into contact with the opposite ends of said metallic sleeve to place said sleeve in compression and prevent the axial movement of the bearing assembly relative to the spindle of the first member. The high density synthetic resin bearing washers which are employed are provided with axially extending, circumferential skirts which cooperate with the bushing to prevent the ingress of dirt, dust, water and other deleterious materials to the interior of the bearing and contact with the bearing surfaces. By virtue of its ability to withstand axial compressional loading of considerable magnitude, sudden and repeated shocks and vibrational stress, and to prevent the malfunctioning of the bearing due to the infiltration of deleterious materials to the bearing surfaces, the present bearing assembly is ideally adapted for use in interconnecting the upper and lower control arms of an automobile steering assembly to the frame of the automobile.

The invention may be better understood and the foregoing objects and advantages more clearly appreciated from a reading of the following detailed description of the invention in conjunction with a perusal of the accompanying drawings which illustrate our invention.

In the drawings:

FIGURE 1 is a view in elevation illustrating the outward appearance of the bearing assembly of the present invention as it appears in its assembled status.

FIGURE 2 is a vertical sectional view of the structure illustrated in FIGURE 1.

FIGURE 3 is an exploded sectional view showing the several elements of the bearing assembly detached from each other and in the relationship in which they are shown in FIGURE 2.

FIGURE 4 is a vertical sectional view of a further embodiment of this invention.

Referring now to the drawings in detail and, particularly, to FIGURES 1 and 2, reference character 10 designates a first member which it is desired to pivotally interconnect to a second member 12. The first member 10 is provided with a generally cylindrical spindle portion 14 along the length thereof, and the second member 12 is provided with an aperture 16 therein which may conveniently be formed through a hub portion 18 and which functions to receive the spindle portion 14 of the first member 10. A circumferential shoulder 20 is formed at the junction of the generally cylindrical spindle portion 14 with the remainder of the first member 10. In a preferred embodiment of the invention, the cylindrical portion 14 of the first member 10 is provided with a threaded bore 21 in one end thereof for threadedly engaging the shank 22 of a bolt 23 having a standard hexagonal bolthead 24.

The elements of the bearing assembly which are utilized to interconnect the members 10 and 12 are illustrated in section in FIGURES 2 and 3. Positioned concentrically around the cylindrical spindle portion 14 is a metallic sleeve 26, which is preferably constructed of steel or similar high strength material. The metallic sleeve 26 is slidingly engaged with the spindle portion 14 and is preferably of slightly shorter length than the spindle portion. In the preferred embodiment of the invention, a cylindrical sleeve 28 constructed of a high density, synthetic resin is pressed in concentric relation over the metallic sleeve 26 with a frictional fit such that the resin sleeve 28 will pivot about the spindle portion 14 with the metallic sleeve 26. In a modified embodiment of the invention, the resin sleeve 28 may be omitted, since its presence is not absolutely essentially to the improved functioning of the bearing assembly of the present invention. Nevertheless, since the utilization of the resin sleeve 28 does permit the bearing to offer less resistance to relative movement of the members 10 and 12, its employment is preferred.

Pressed into the aperture 16 in the member 12 is a composite bushing which includes a cylindrical metallic member 30 into which is press fitted a bushing 32 of high density, synthetic resin material. In the assembled status of the bearing, the metallic cylindrical member 30 is pressed into the aperture 16 in the member 12 and is fit sufficiently tightly therein to turn with the member 12 relative to the member 10. The resin bushing 32 also turns with the metallic cylindrical member 30 by virtue of its press fit therein.

The metallic, cylindrical member 30 is provided at its end nearest the free end of the cylindrical spindle 14 with a circumferential flange 34 which extends radially outward from the cylindrical member 30 and abuts flatly against the upper surface of the hub portion 18 of the member 12 when the bearing is assembled. The resin bushing 32 is provided with a thickened or enlarged portion 36 at its end adjacent the free end of the spindle 14, and is further provided with a radially extending, circumferential flange 38 which protrudes outwardly in a radial direction slightly beyond the edge of the flange 34 of the metallic cylindrical member 30. When the bearing is assembled as shown in FIGURE 2, the resin bushing 32 is positioned inside the metallic cylindrical member 30, and is in sliding bearing engagement with the resin sleeve 28.

Adjacent each end of the cylindrical spindle portion 14 of the member 10 are metallic washers 40 and 42 of generally cup-shaped configuration. A small, annular metallic washer 43 may be provided between the head 24 of bolt 23 and the metallic washer 42 to more evenly transmit the compressional force exerted by the tightened bolt to the bearing elements. When the bearing is assembled and the bolt 23 is threaded tightly into the bore 21 of the spindle 14, the head 24 of the bolt bears against the upper metallic washer 42, either directly or through the washer 43, and the circumferential shoulder 20 of the member 10 is in abutting contact with the lower metallic washer 40. The metallic washers 40 and 42 are also contacted by the opposite ends of the steel sleeve 26 so that the loading of the bearing which is imposed by tightening the bolt 21 is carried primarily by the steel sleeve 26.

Each of the cup-shaped metallic washers 40 and 42 is provided with an annular, axially extending skirt portion 44 and 46, respectively. Pressed into each of the cup-shaped metallic washers 40 and 42, respectively, are a pair of cup-shaped bearing washers constructed of high density, synthetic resinous material. The resin bearing washer which is pressed into the metallic washer 40 and is frictionally retained therein is designated generally by reference character 48, and the resin bearing washer which is pressed into the metallic washer 40 and frictionally engaged therewith is designated generally by reference character 50.

The cup-shaped resin bearing washer 50 has integrally formed therewith a circumferential skirt portion 52 which extends in an axial direction from the open end of the resin bearing washer 48, and a circumferential shoulder 54 which extends radially inward from the skirt portion 52. The circumferential shoulder 54 and skirt portion 52 of the resin bearing washer 50 engage the circumferential flange 38 at the upper end of the resin bushing 32 and provide therewith an interlocking seal, as shown in FIGURE 2, which prevents the infiltration of dust and mud to the interior of the bearing. This is one of the more important concepts of the present invention. Also, as most clearly illustrated in FIGURE 2, the base portion of the cup-shaped resin bearing washer 50 is interposed between the thickened portion 36 of the resin bushing 32 and the metallic washer 42 so that the greater portion of the load imposed upon the bushing 32 is received by the mechanically stronger thickened portion 36 thereof.

Like the cup-shaped resin bearing washer 50, the resin bearing washer 48 is cup-shaped in configuration and is pressed into the cup-shaped metallic washer 40 with a tight frictional fit. A circumferential skirt 56 extends in an axial direction from the cup-shaped resin bearing washer 48 and is interconnected thereto by an integrally formed, annular, radially extending circumferential shoulder 58. When the bearing is assembled, the free edge of the metallic washer 40 bears against the circumferential shoulder 58 and the circumferential, axially extending skirt 56 fits around the metallic cylindrical member 30 in the manner shown in FIGURE 2 to prevent the ingress of deleterious materials to the interior of the bearing.

The materials of construction of the various washers and bushings of the present invention are of considerable importance to its efficient functioning. The primary bearing action which occurs within the bearing assembly as the members 10 and 12 are pivoted relative to each other is that which occurs at the contacting surfaces of the high density, synthetic resin bushing 32 and the bearing washers 48 and 50 which, it will be recalled, are also constructed of a high density, synthetic resin material. Because the resin bushing 32 is pressed into the cylindrical metallic member 30 which is, in turn, press fitted in the hub 18 of the member 12, the resin bushing will turn with the member 12 relative to the spindle portion 14 of the member 10. The resin bearing washers 48 and 50, on the other hand, are pressed into the cup-shaped metallic washers 40 and 42 and remain fixed with respect thereto during pivotation of the members 10 and 12. Since the metallic members 40 and 42 are engaged by the steel liner 26 and are biased thereagainst by the retaining shoulder 20 on the member 10 and the head 24 of the bolt 23, these members remain fixed relative to the member 10.

It will thus be seen that when the members 10 and 12 are moved relative to each other, the resin bushing 32 moves relative to the resin bearing washers 48 and 50. Since the surface of contact between these members constitutes the primary bearing of the invention, it is contemplated that these elements of the assembly be constructed of a resinous material having a low coefficient of friction. High density, polymerized amide materials, such as those sold under the trade name Nylon, and high density polyethylenes having a low coefficient of friction, such as those sold under the trade names Super-Dylan, Marlex, Fortiflex, Poly-Eth and Hy-Flex, are the preferred materials of construction. We have also found that high density polymerized halohydrocarbons, such as fluorotrichloro ethylene and tetrafluoroethylene, sold under the trade names Kel-K and Teflon, respectively, may also be utilized in the bearing.

We have found that superior results are obtained when the synthetic resin bearing washers 48 and 50 are constructed of a resin having a dissimilar molecular structure from the resin of which the bushing 32 is constructed. The explanation for this improved performance resulting from the use of differing molecular types in the bearing washers 48 and 50 and the bushing 32 appears to be that a slight degree of interpolymerization occurs at the surfaces of the contacting bearing elements under conditions of heavy loading and high temperatures induced by frequent pivotation of the members 10 and 12 relative to each other when the elements are constructed of the same material. Using materials of different molecular structure avoids such interpolymerization and the sticking which results therefrom. Since some bearing action also occurs at the interface between the resin liner 28 which is pressed onto the metallic liner 26 and the inner surface of the resin bushing 32, it is also preferred to construct the resin liner 28 and the resin bushing 32 of molecularly dissimilar, high density, synthetic resins having a low coefficient of friction. The same materials which have previously been mentioned hereinbefore may be utilized for the construction of the resin liner 28.

The experience of applicants with bearings constructed in accordance with the present invention has been that such bearings may be constructed much more economically than bearing assemblies depending upon the use of ball bearings or other metallic bearing members for their functioning. Moreover, the plastic bearing construction of the present inventon is characterized by a longer and more trouble-free operating life than such metallic bearings and approaches closely the anti-frictional characteristics which are attributable to ball bearings at the earliest or initial stages of the life of such ball bearings. Relatively early in the life of the bearings, the performance which is characteristic of the bearings of the present invention becomes superior to that which is characteristic of metallic bearings at the the same stage in the service life of the assembly by virtue of the tendency of the latter bearings to become fouled or clogged with dirt and grit and also to become distorted and misshapen under the constant stresses to which bearings of this type are subjected.

Although modifications and innovations may be made in the bearing assembly hereinbefore described by way of example, it is to be appreciated that many of such changes and modifications are those which will be demanded by particular circumstances of use and which will be readily apparent to those skilled in the art. Changes such as these which do not require substantial departure from the basic principles herein disclosed are considered to be encompassed within the spirit and scope of the present invention except as the same may be necessarily limited by the language of the appended claims.

We claim:

1. A bearing assembly pivotally connecting a first member having a cylindrical portion to a second member extending normal to said first member and having a generally circular aperture therein for receiving the cylindrical portion of said first member comprising:

a cylindrical metallic member pressed into the aperture in said second member for pivotal movement with said second member about the cylindrical portion of said first member, said cylindrical metallic member coaxially surrounding the cylindrical portion of said first member and having a bore therethrough of substantially larger diameter than said cylindrical portion whereby an annular space exists between said cylindrical metallic member and said cylindrical portion;

a high density synthetic resin cylindrical bushing pressed into said cylindrical metallic member and protruding beyond the opposite ends thereof in an axial direction with respect to said cylindrical metallic member;

a cylindrical metallic sleeve surrounding said cylindrical portion and concentrically inserted in said resin bushing and positioned with each of its ends protruding beyond the ends of said resin bushing;

a metallic retainer means on the cylindrical portion of said first member and cooperating with said first member to limit axial movement of said metallic sleeve on said cylindrical portion and high density synthetic resin bearing means positioned between said metallic retainer means and said high density synthetic resin cylindrical bushing and around said cylindrical metallic sleeve in bearing contact with said resin bushing.

2. A bearing assembly as claimed in claim 1 wherein said metallic retainer means comprises:

a circumferential shoulder on said first member in juxtaposition to said cylindrical portion;

a first annular metallic washer around said cylindrical portion and contacting said shoulder, one end of said cylindrical metallic sleeve and said synthetic resin bearing means;

a bolt having a head threaded into said first member and spaced along said cylindrical portion from said annular metallic washer by a distance substantially equal to the length of said cylindrical metallic sleeve; and a second metallic washer bearing against said bolt head and contacting the end of said cylindrical metallic sleeve opposite said first annular metallic washer, and said second metallic washer further contacting said synthetic resin bearing means.

3. A bearing assembly as claimed in claim 1 and further characterized to include a high density synthetic resin sleeve pressed over said metallic sleeve and frictionally retained thereon, said resin sleeve being slidingly inserted in said cylindrical resin bushing.

4. A bearing assembly as claimed in claim 1 wherein said high density synthetic resin cylindrical bushing and said high density synthetic resin bearing means are constructed of resins of differing molecular configuration.

5. A bearing assembly as claimed in claim 2 wherein said synthetic resin bearing means comprises:

a first resin bearing washer interposed between said first annular metallic washer and said cylindrical resin bushing; and a second resin bearing washer interposed between said second annular metallic washer and said cylindrical resin bushing.

6. A bearing assembly as claimed in claim 5 wherein said first and second metallic washers are generally cup-shaped in configuration, and said first and second high density synthetic resin bearing washers are generally cup-shaped and are pressed into said cup-shaped metallic washers and frictionally retained therein for pivotal movement with said metallic washers relative to said resin bushing, said cup-shaped resin bearing washers extending over and around the projecting ends of said resin bushing whereby bearing contact is established between the outer periphery of said resin bushing and the inner periphery of said bearing washers.

7. A bearing assembly as claimed in claim 4 wherein the synthetic resins of which said high density synthetic resin cylindrical bushing and said high density resin bearing means are constructed are selected from the group consisting of polymerized amides, polyethylene, and polymerized halohydrocarbons.

8. A bearing assembly as claimed in claim 6 and further characterized to include a circumferential skirt portion extending axially from the open end of said second cup-shaped resin bearing washer toward said cylindrical metallic member;

a circumferential shoulder of high density synthetic resin inside the second cup-shaped resin bearing washer adjacent said circumferential skirt portion and extending radially inwardly from said circumferential skirt portion; and a circumferential resin flange integral with one of the projecting end portions of said resin bushing and extending radially outward therefrom, said circumferential flange contacting at its outer periphery the inner periphery of said circumferential skirt portion and bearing against said circumferential resin shoulder whereby said resin bushing and said second cup-shaped resin bearing washer are sealingly engaged to prevent the infiltration of deleterious materials to the interior of said bearing.

9. A bearing assembly as claimed in claim 3 wherein said high density synthetic resin sleeve and said resin cylindrical bushing are constructed of resins of differing molecular configuration.

10. A bearing assembly as claimed in claim 3 wherein said resin sleeve and said resin cylindrical bushing are constructed of resins selected from the group consisting of polymerized amides, polyethylene, and polymerized halohydrocarbons.

11. A bearing assembly as claimed in claim 8 and further characterized to include a metallic circumferential flange secured around said cylindrical metallic member in juxtaposition to said circumferential resin flange and in contact therewith to provide reinforcement and support for said circumferential resin flange.

12. A bearing assembly for pivotally connecting two members, one of which is provided with a cylindrical spindle portion and the other of which is apertured to receive said spindle portion, comprising:

a metallic sleeve around said cylindrical spindle;

adjustable means on said spindle portion at each end of said metallic sleeve for placing said metallic sleeve in compression for turning movement with said spindle when said adjustable means are adjusted;

cylindrical, synthetic resin bushing means positioned in the aperture in said other member and slidingly and concentrically surrounding said metallic sleeve for turning movement with said other member relative to said metallic sleeve; and synthetic resin bearing means interposed between said adjustable means and said resin bushing means and forming a bearing with said resin bushing means to permit said bushing means to turn freely relative to said adjustable means.

13. A bearing assembly as claimed in claim 12 wherein said adjustable means comprises a circumferential shoulder formed on said spindle adjacent one end of said metallic sleeve for limiting axial movement of said sleeve in one direction along said spindle; and a bolt threaded into said spindle portion adjacent the other end of said metallic sleeve and axially adjustable with respect to said spindle portion to place said metallic sleeve in compression.

14. A bearing assembly as claimed in claim 12 wherein said bushing means and said bearing means are constructed of resins of differing molecular structure.

15. A bearing assembly as claimed in claim 12 and further characterized to include a metallic member pressed into said aperture and around said resin bushing means for turning movement with said other member and said bushing means relative to said metallic sleeve.

16. A bearing assembly as claimed in claim 13 and further characterized to include a pair of cup-shaped metallic washers disposed at opposite ends of said metallic sleeve and positioned between said sleeve and said circumferential shoulder and said bolt respectively.

References Cited in the file of this patent
UNITED STATES PATENTS 2,642,318    Ricks                    June 16, 1953
2,952,486    Reuter et al.             Sept. 13, 1960